Sept. 18, 1962     J. S. BONNETTE     3,054,427
RADIATOR TEST PLUG
Filed Oct. 20, 1958
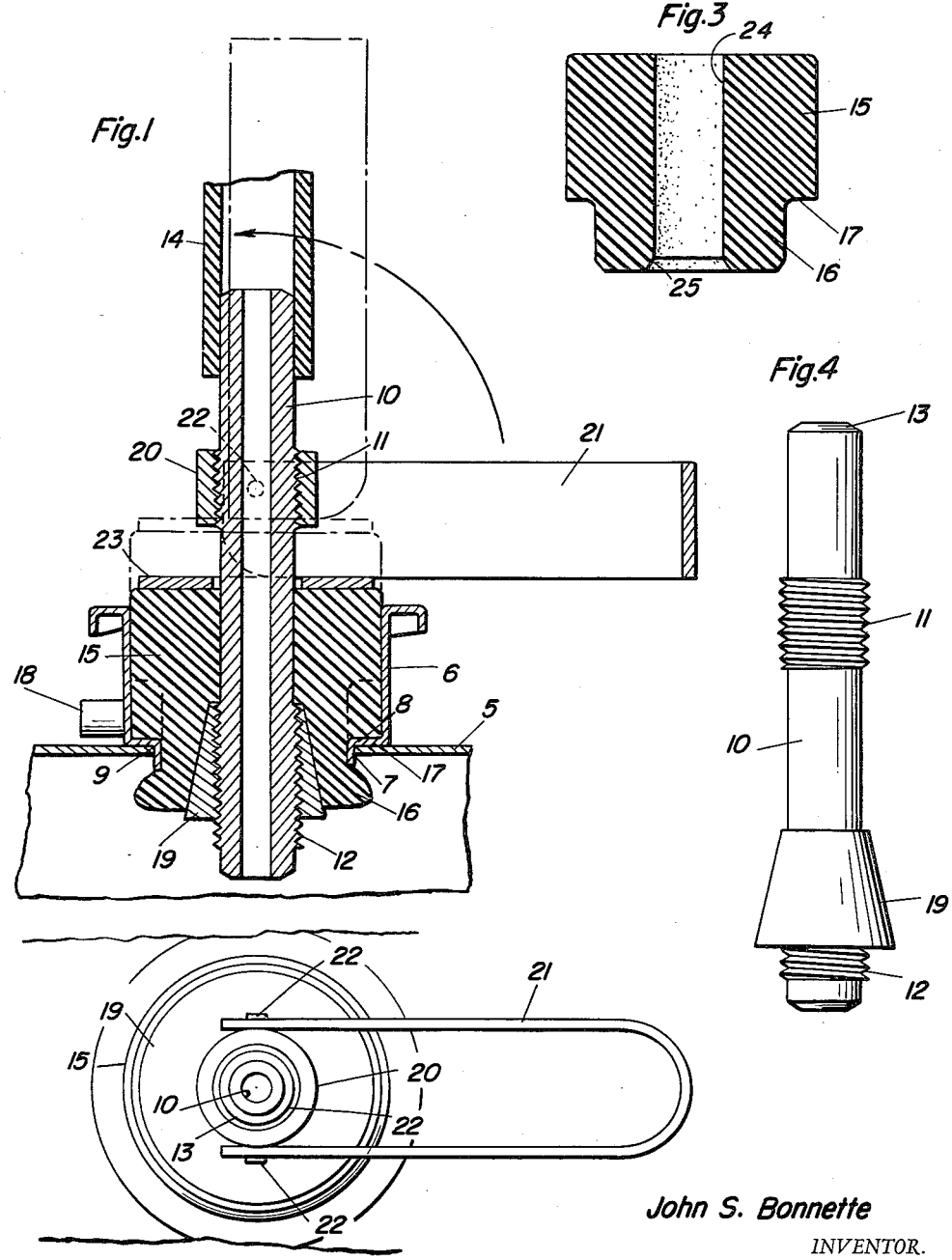
John S. Bonnette
INVENTOR.
BY *Clarence A. O'Brien*
*and Harvey B. Jackson*
Attorneys 3,054,427
Patented Sept. 18, 1962

3,054,427
RADIATOR TEST PLUG
John S. Bonnette, 6802 S. Hall St., Houston, Tex.; Mary Jane Bonnette, executrix of said John S. Bonnette, deceased
Filed Oct. 20, 1958, Ser. No. 768,227
2 Claims. (Cl. 138—90)

This invention relates to new and useful improvements in test plugs particularly for the high pressure radiators of motor vehicles and has for its primary object to provide, in a manner as hereinafter set forth, a device of this character which is adapted to seal the filler neck at a point below the usual overflow.

Another important object of the present invention is to provide a motor vehicle radiator test plug of the aforementioned character which is engageable beneath the lower end of the filler neck for positively anchoring the device therein.

Still another important object of the invention is to provide a radiator test plug of the character described comprising novel securing means whereby said plug may be expeditiously inserted in the filler neck and removed therefrom with a minimum of effort.

Other objects of the invention are to provide a radiator test plug of the character set forth which will be comparatively simple in construction, strong, durable, compact, safe and reliable and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical sectional view through a radiator test plug constructed in accordance with the present invention, showing the device in position in the filler neck of a radiator;

FIGURE 2 is a top plan view thereof;

FIGURE 3 is a detail view in vertical section through the resilient, expansible bushing or stopper; and FIGURE 4 is a detail view in elevation of the air tube and the swage nut or cone mounted thereon.

Referring now to the drawing in detail, it will be seen that reference character 5 designates a portion of the upper or top tank of a motor vehicle radiator. The tank 5 is provided with a conventional filler neck 6 having a reduced lower end portion 7 providing a seat 8 for the radiator pressure cap (not shown). The reduced end portion 7 of the filler neck 6 is anchored in an opening 9 provided therefor in the top of the tank 5.

The embodiment of the present invention which has been illustrated comprises an air tube 10 of suitable metal. The air tube 10 includes a threaded intermediate portion 11 and a threaded lower end portion 12. The tube 10 further includes a substantially rounded or tapered upper end portion 13 to facilitate slipping an air hose 14 thereon.

Mounted on the air tube 10 between the threaded portions 11 and 12 thereof is an expansible stopper or bushing 15 of resilient rubber or other suitable material. The bushing 15 comprises an externally reduced lower end portion 16 which is insertable through the reduced end portion 7 of the filler neck 6 in a manner to project therebelow into the tank 5. The reduced end portion 16 of the bushing 15 provides a shoulder 17 which is engageable on the seat 8 of the filler neck 6. When thus inserted the bushing 15 closes and seals the usual overflow 18 of the filler neck 6.

Threadedly mounted on the lower end portion 12 of the air tube 10 is a swage nut or cone 19 of suitable metal. The cone 19 is engageable in the lower portion of the bushing 15 for expanding the same in the filler neck 6 and for engaging the portion 16 of said bushing beneath the lower end portion 7 of said filler neck thus positively anchoring the device in position and sealing the tank 5. The lower portion 16 of the bushing 15 is externally and internally shaped to facilitate insertion in the portion 7 of the neck 6 and to receive the cone 19.

Resting on top of the bushing 15 and encircling the air tube 10 is a thrust bearing or washer 23. A metallic nut or ring 20 is threaded on the portion 11 of the air tube 10 in the embodiment of the invention shown. A substantially U-shaped cam lever 21, operable on the thrust washer 23, has its end portions pivotally secured at 22 to the ring 20.

It is thought that the use of the device will be readily apparent from a consideration of the foregoing. Briefly, with the cam lever 21 in raised position and the bushing 15 contracted, said bushing is inserted downwardly in the filler neck 6. When properly inserted the shoulder 17 rests on the seat 8 below the level of the overflow 18 and the reduced lower end portion 16 of said bushing extends downwardly into the tank 5 through the reduced portion 7 of said neck. The cam lever 21, riding on the thrust washer 23, is then swung downwardly to the position of FIGURE 1 of the drawing for pulling the air tube with the cone 19 thereon upwardly in the bushing 15 for expanding said bushing in an obvious manner. The construction and arrangement of parts is such that a perfect seal is ensured regardless of grease, dirt, etc., in the filler neck, which constitutes a highly important and desirable feature of the invention. Also, the necessity of installing an overflow line is obviated. The thread 12 permits adjustment, if desired, of the cone 19 on the air tube 10 and the thread 11 permits adjustment of the cam lever 21 on said air tube. Of course, to remove the device the foregoing procedure is substantially reversed.

As can be most clearly observed from FIGURES 1 and 3, the bushing 15 is provided with a bore 24 which slidably receives that portion of the air tube 10 between the threaded portions 11 and 12, and that the lowermost end of the bore 24 is provided with an outwardly tapered counterbore 25 which assists in the positioning of the smaller end of the cone 19 into the bore 24.

As the cam lever 21 is actuated to move the cone 19 into the adjacent lower end of bore 24, after the bushing 15 has been seated within the filler neck with the reduced lower portion 16 extending through the reduced end portion 7 of the filler neck 6 and into the tank 5, the entrance of the cone 19 into the portion of the bore 24 disposed in the reduced lowermost portion 16 first radially expands that portion of the reduced portion 16 extending into the tank to restrict the removal of the bushing 15 and then, as the cone 19 moves further into the lower end of the bore 24, the portion of the reduced end portion of the bushing immediately adjacent the reduced end portion of the filler neck is expanded providing an extremely airtight seal with the filler neck as the reduced portion 16 is even further expanded. As the reduced portion 16 is expanded upon the entrance of the cone 19 into the lower end of the bore 24, the thrust effected by the cam lever also places a downward thrust on the thrust washer 23 to radially expand the entire enlarged upper portion of the bushing 15 into tight frictional engagement with the inside surfaces of the enlarged portion of the filler neck 6 to form an airtight seal therewith. Of course, the radial expansion of the enlarged portion of the bushing 15 also forms an airtight seal between the latter and the air tube 10 passing therethrough.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. For use with a radiator filler neck of the type including an enlarged end portion in a diametrically reduced opposite end portion defined by a radially extending annular shoulder, a test plug, said test plug comprising a resilient, expandable and cylindrical bushing adapted to be snugly received in said filler neck, said bushing including an enlarged end portion and a diametrically reduced opposite end portion defined by a radially extending annular shoulder, said bushing being adapted to be seated in said neck with the enlarged and reduced end portions thereof received in the enlarged and reduced end portions respectively of said filler neck and its shoulder in surface to surface contacting relation with the shoulder of said filler neck and the reduced end portion of said bushing projecting beyond the end of the reduced end portion of said filler neck remote from the enlarged end portion thereof, a longitudinally extending and generally constant diameter bore formed through said bushing, and air tube having a smooth outer portion snugly and slidably disposed in said bore, said bore including a shallow inwardly tapered counterbore, a tapered cone, means securing said cone to the end of said tube with the smaller end thereof adjacent the reduced portion of said bushing and for adjustment longitudinally of said tube, said cone including smooth outer side surfaces disposed at sharp acute angles relative to the longitudinal axis of said cone and being wedgingly and slidingly receivable in the adjacent end of said bore, said smaller end of said cone being slidably receivable in the outer end of said counterbore, and thrust means secured to said tube adjacent the enlarged portion of said bushing for longitudinally compressing said bushing and moving said tube outwardly of the enlarged end of said bushing whereby said cone will enter the said counterbore and the adjacent end of said bore and radially expand the surrounding reduced portion of said bushing disposed through the reduced end portion of the filler neck to prevent retraction of said bushing from the enlarged end portion of said filler neck while simultaneously radially expanding said bushing into frictional engagement with the internal surfaces of the enlarged and reduced portions of said filler neck and applying axial thrust of the shoulder of the bushing toward the shoulder of the filler neck.

2. The combination of claim 1 wherein said thrust means comprises a ring threadedly mounted on said tube outwardly of the enlarged portion of said bushing, a thrust washer slidably disposed on said tube intermediate said ring and said bushing, and a substantially U-shaped cam lever pivotally mounted on the ring and operatively engaged with said thrust washer.

References Cited in the file of this patent

UNITED STATES PATENTS

| | | |
|---|---|---|
| 633,537 | Stewart | Sept. 19, 1899 |
| 910,966 | Simon | Jan. 26, 1909 |
| 2,604,225 | Armstrong | July 22, 1952 |
| 2,621,679 | Tuttle | Dec. 16, 1952 |
| 2,708,588 | Prah | May 17, 1955 |